Aug. 27, 1957  H. W. TREVASKIS  2,804,176
DISC BRAKE
Filed Dec. 14, 1953  2 Sheets-Sheet 2
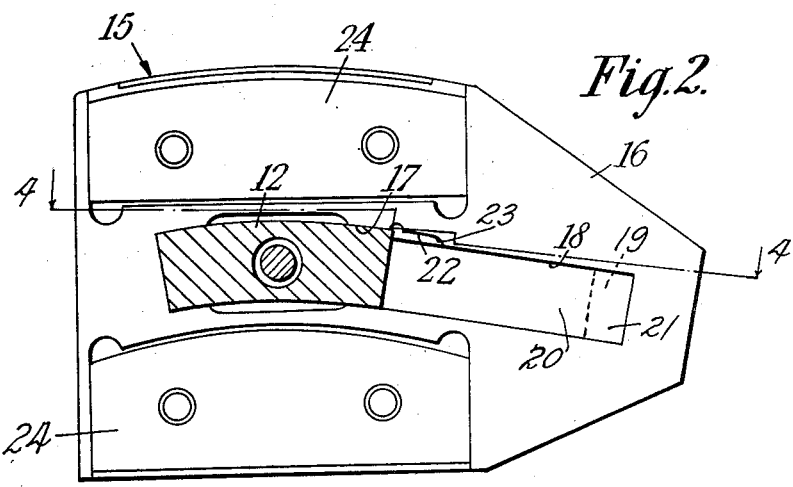
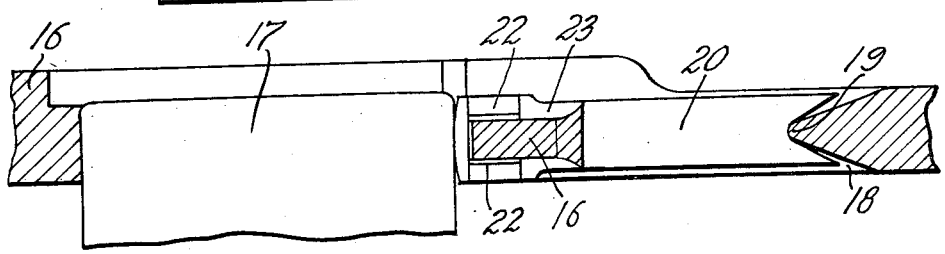
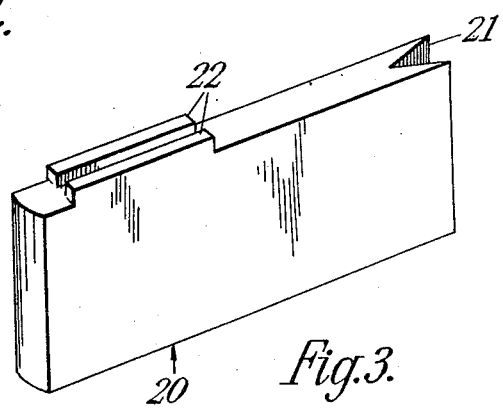
INVENTOR
Henry William Trevaskis
by Benj. T. Rauber
his attorney

United States Patent Office 2,804,176
Patented Aug. 27, 1957

2,804,176

DISC BRAKE

Henry William Trevaskis, Solihull, England, assignor to Dunlop Rubber Company Limited, London, England, a British company Application December 14, 1953, Serial No. 398,166

Claims priority, application Great Britain December 18, 1952

10 Claims. (Cl. 188—73)

This invention relates to disc brakes, and more particularly relates to disc brakes for aircraft.

Disc brakes for aircraft are known comprising one or more annular discs dogged to the inner periphery of a wheel rim and axially slidable relative thereto. A non-rotatable torque plate is secured to the wheel assembly, said torque plate being in the form of a caliper straddling the outer periphery of the disc or discs, and a fluid pressure operated mechanism is provided to force the disc or discs and pads of friction material located on each side thereof together in frictional engagement, hence braking the wheel.

Brake discs are seldom truly planar, due to machining irregularities and also to the effect of the heat generated on braking, which tends to distort the discs. This unevenness of the braking surfaces of the discs can cause snatching of the brake, chatter and a certain loss of efficiency.

My present invention provides a brake construction wherein this objection is largely overcome.

The disc brake of my invention comprises a disc rotatable with a wheel and axially slidable relative thereto, non-rotatable friction pads located on one side of said disc, non-rotatable axially-slidable friction pads located on the other side of said disc and mounted on plates adapted to rock and allow the pads to adapt themselves to irregularities in the braking surface of said disc and a mechanism for forcing the disc, plates and pads together to bring the disc and pads into frictional engagement.

Preferably, the brake comprises a pair of inner and a pair of outer annular discs spaced axially apart, an annular gap being provided between the inner and outer discs. A non-rotatable torque plate, provided with fluid pressure operated piston and cylinder mechanisms at diametrically opposed locations, supports sleeves which are secured at one end to the torque plate and which extend axially between the inner and outer discs in co-axial alignment with each of the fluid pressure operated mechanisms. An operating rod is fitted through each sleeve and has one end secured to the piston of said mechanism and the other end associated with a pressure plate slidable on the end of the sleeve. Friction pads are secured to the pressure plate and torque plate and also to both sides of a carrier plate slidable on the sleeve intermediate the axially spaced discs. Said carrier plate is provided on one edge with a slotted extension and rockable means are provided within said slotted extension and co-operating with one side of the sleeve to allow the plate to rock about the sleeve and so allow the friction pads secured thereto to adapt themselves to irregularities in the braking surface of the disc.

Whilst it is preferred that only the intermediate friction pads, i. e. those located between each radially-aligned pair of discs, should be secured to a rockable carrier plate, nevertheless the pressure plate, i. e. the plate carrying the friction pads on the side of the assembly of discs remote from the torque plate, may be similarly rockable. It is not normally considered necessary to rockably mount the friction pads associated with the torque plate. Thus only the axially movable friction pads need be mounted on plates adapted to rock and allow the pads to adapt themselves to irregularities in the braking surfaces of the discs.

In order that the invention may be more fully described reference is made to the attached drawings of which:

Figure 2 is a view of a carrier plate constructed according to the invention.

Figure 3 is a perspective view of the rocker member constructed according to the invention.

Fig. 4 is a section of the brake taken on line 4—4 of Fig. 2.

Figure 1:
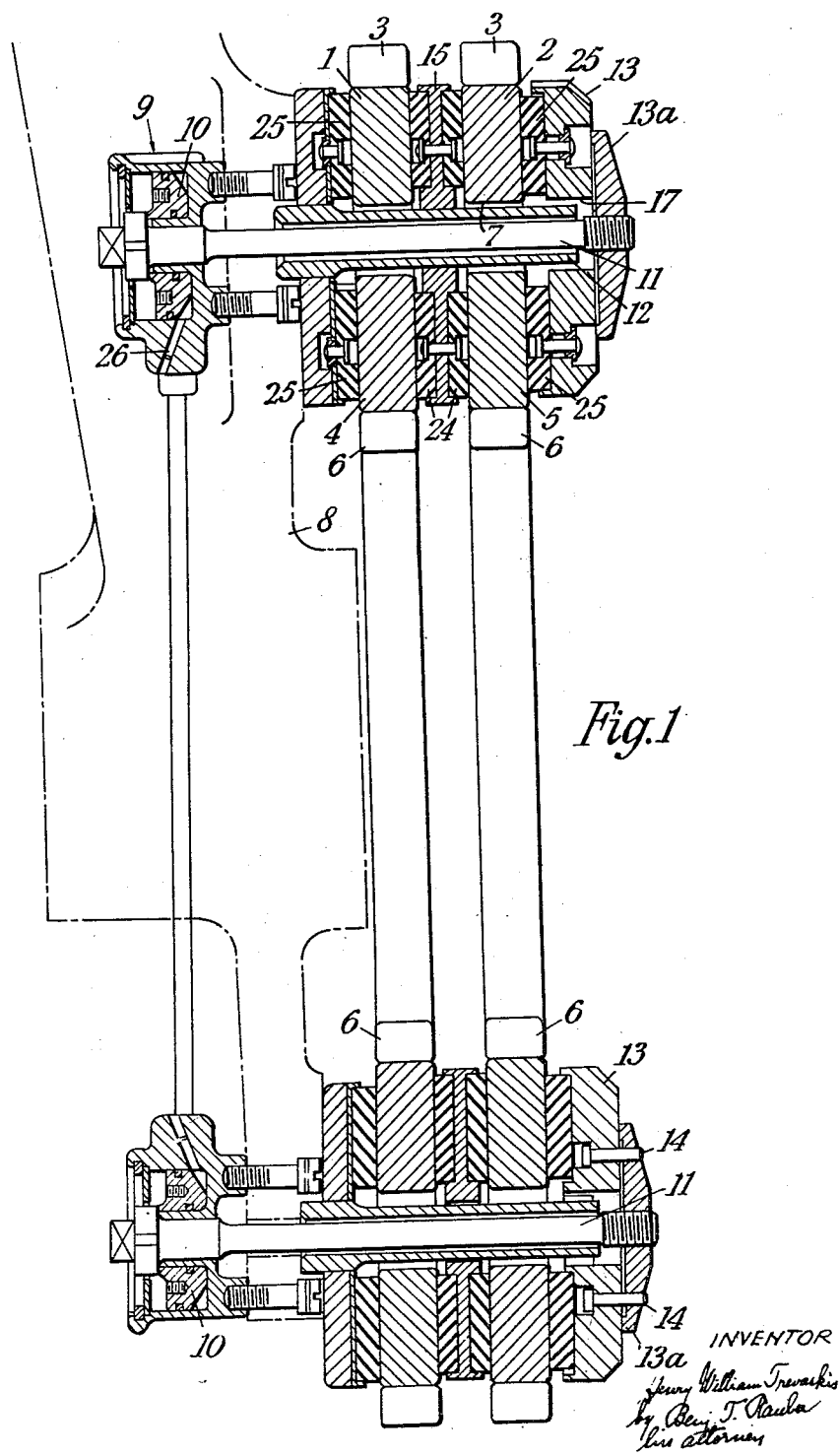
Figure 1 is a section of a brake constructed in accordance with the invention.

The disc brake for aircraft illustrated in Figure 1 comprises a pair of outer annular discs 1, 2 spaced axially apart and provided at their outer peripheries with driving dogs 3 slidably engaging in axially extending slots in the inner periphery of an aircraft wheel rim (not shown). A pair of inner annular discs, 4, 5 spaced axially apart and radially aligned with the outer discs, 1, 2 are provided on their inner peripheries with driving dogs 6 slidably engaging with axially-extending slots on the outer periphery of the wheel hub (not shown). All four discs are thus rotatable with the wheel and axially slidable relative thereto. An annular gap 7 is provided between the inner and outer discs.

A torque plate 8 is secured to a non-rotatable part of the wheel assembly and extends diametrically across the wheel on one side of the discs 1 and 4. A fluid pressure operated piston and cylinder mechanism 9 is associated with each end of the torque plate, each piston 10 being provided with an operating rod 11 which extends axially through a hole in said torque plate and through a sleeve 12 which has one end secured to said plate 8 and which extends axially through the annular gap 7 between the inner and outer discs. The sleeve is of segmental section, two opposite sides being curved substantially to the radius of the discs and the remaining opposite sides extending radially.

A pressure plate 13 is associated with the end of the sleeve remote from the torque plate and on the side of the assembly of discs remote from the torque plate, and the end of the operating rod 11 is secured to a plate nut 13a which abuts the pressure plate 13, and is secured thereto by dowels 14, whereby movement of the piston 10 to the left as viewed in Fig. 1, in the mechanism 9 when pressurised will draw the plate nut 13a and the pressure plate 13 towards the torque plate 8. A carrier plate 15 (Figs. 1 and 2) slidable on the sleeve 12 is located intermediate the axially spaced discs, having one edge thereof shaped to conform to the outside radius of the outer discs 1 and 2, and having a substantially triangular extension 16 provided on the trailing edge. The leading edge may be at a substantial right angle to each side edge.

The part of the carrier plate 15 exclusive of the triangular extension 16 is provided centrally with a segmental shaped hole 17 in which the sleeve 12 is slidably fitted, and the triangular extension is also provided with a slot 18 which communicates at one end with the hole 17, the longitudinal axis thereof being normal to the adjacent radially extending side of the sleeve 12.

The end of the slot 18 remote from the sleeve is formed as a radially-aligned seating portion 19 tapered from each side towards the sleeve.

A rocker member 20 (Figure 3) is fitted within said slot 18, one end thereof being provided with a grooved seat 21 to co-operate with the seating portion 19, thus enabling the rocker member to rock relative to the pressure plate. The other end of the rocker member 20 is part-cylindrical and this end abuts the adjacent radially-extending side of the sleeve. Excessive angular movement of the rocker member 20 relative to the slot 18 is prevented by two rectangular ears 22 which project from the upper side of the rocker member one at each edge, at the end adjacent the sleeve, and engage in recesses 23 in the slot, a clearance being provided between the insides of the ears 22 and the adjacent sides of the recesses 23. Pads of frictional material 24 are secured to both sides of the carrier plate, to frictionally engage the faces of each of the inner and outer discs.

Further pads of friction material 25 to frictionally engage the faces of the discs adjacent the torque plate 8 and the pressure plate 13 are secured directly to said torque plate, and pressure plate.

The operation of the brake is as follows. Pressure fluid is introduced into mechanism 9 through the conduit 26 causing the pistons 10 to move outwardly, that is to the left as viewed in Fig. 1, pulling the plate nut 13a secured thereto by the operating rod 11 towards the torque plate 8. The pressure plate 13 and carrier plate 15 slidably move along the sleeve 12 and the discs 1, 2, 4, and 5 move axially along the slots in the wheel rim and hub respectively, until the whole assembly of discs and friction pads is forced together in frictional engagement, thus braking the wheel.

The torque, when the brake is applied, tends to rotate the carrier plate 15 in the direction of rotation of the discs, and the extension 16 to each plate is connected, through the rocker member 20, to the rigid sleeve 12. The carrier plates 15 can thus rock slightly up to the limit imposed by the clearance between the ears 22 of said members and the sides of the recesses 23 in the slot, to compensate for irregularities in the braking surface of the disc.

The pressure plate 13 may be provided with a triangular extension and rocker member as described in connection with the carrier plate.

Having described my invention, what I claim is:

1. A disc brake comprising an annular rotatable and axially slidable disc, a non-rotatable friction pad located on one side of the said disc, a non-rotatable axially slidable plate located on the other side of said disc and having an aperture, a friction pad mounted on said plate to face said brake disc, a non-rotatable axially extending member passing through said aperture, means located within said aperture to allow said plate to rock relative to said axially extending member and means to force said disc and friction pads together into frictional engagement.

2. The disc brake of claim 1 having a rocker member in said aperture pivoted at one edge to an edge of said aperture and bearing against said axially extending member.

3. The brake disc of claim 2 in which said member has a groove in its edge pivoted to the edge of said aperture and in which said edge of said aperture is tapered to fit into said groove.

4. The disc brake of claim 2 having a non-rotatable part of a wheel assembly and in which said axially extending member is a sleeve extending from said non-rotatable part of said wheel assembly and in which said means to force the disc and friction pad together comprises a rod extending through said sleeve and secured at one end to said plate and a piston and cylinder mechanism secured to the opposite end of said rod.

5. The disc brake of claim 2 in which the edge of said aperture is provided with recesses from its opposite faces and in which said rocker member is provided with projecting ears to be received in said recesses to restrict the rocking movement of said rocker member.

6. A disc brake which comprises an axially slidable rotatable brake disc, a non-rotatable torque plate extending diametrically at one side of said disc and having at each end a brake-applying mechanism comprising an apertured supporting plate, a sleeve extending at a right angle to said plate adjacent an edge of said disc, a friction pad mounted on said supporting plate opposite a face of said brake disc and of an area to contact said disc within a limited sector of its area, an axially slidable plate on the opposite side of said brake disc having a pad opposed to the pad of said supporting plate, said axially slidable plate having an aperture to receive said sleeve, a rocking element hinged at one edge of said aperture and projecting to contact with said sleeve to permit said axially slidable plate to rock and a mechanism for drawing said axially slidable plate toward said supporting plate and comprising a rod extending through said sleeve.

7. The brake disc of claim 6 in which said rocker member has a groove at said end engaging the edge of said aperture and in which the edge of said aperture is tapered to be received in said groove.

8. A disc brake which comprises a pair of coaxial coplanar rotatable brake discs, a torque plate extending diametrically at one side of said discs and having at each end a brake-applying mechanism each comprising a supporting plate and an extension therefrom between the adjacent edges of said brake discs, friction pads mounted on said supporting plate to face one side of said discs, a pressure plate on the opposite side of said discs having an aperture to receive said extension and having brake pads facing the other side of said brake discs, and a rocker member fixed in said aperture and bearing against said extension and means to draw said pressure plate toward said supporting plate.

9. A disc brake which comprises two pairs of annular brake discs, one pair spaced from the other and each pair comprising coaxial coplanar spaced annular discs, a torque plate extending diametrically on one side of said disc assembly and having at each end a brake-applying mechanism comprising a supporting plate and an extension therefrom between the coaxial brake discs and friction pads mounted on said supporting plate to bear against the opposite face of said brake discs in an area within a limited sector of the area of said discs, a carrier plate mounted between the spaced coplanar discs of said pairs and having an opening to receive said extension and a rocker member between an edge of said opening and said extension, a pressure plate facing the outer face of said second pair of coplanar discs, friction pads mounted on said carrier plate and said pressure plate in position opposite the friction pads of said supporting plate, and means to draw said pressure plate toward said supporting plate to compress the friction pads of said supporting plate and pressure plate and carrier plate into frictional engagement with said discs.

10. The disc brake of claim 9 in which said extension has a longitudinal passage and in which said pressure applying means comprises a cylinder and piston mounted on said supporting plate and having a rod extending through said passage to and connected to said pressure plate.

References Cited in the file of this patent

UNITED STATES PATENTS

| | | |
|---|---|---|
| 2,306,846 | Sherman et al. | Dec. 29, 1942 |
| 2,325,596 | Evans | Aug. 3, 1943 |
| 2,371,158 | Eby | Mar. 13, 1945 |
| 2,635,714 | Butler | Apr. 21, 1953 |